(12) United States Patent
Noormofidi et al.

(10) Patent No.: US 11,494,924 B2
(45) Date of Patent: Nov. 8, 2022

(54) IMAGE ALIGNMENT FOR NOISY IMAGES

(71) Applicant: KLA Corporation, Milpitas, CA (US)

(72) Inventors: Vahid Noormofidi, San Jose, CA (US); Boshi Huang, San Jose, CA (US); Ge Cong, Pleasanton, CA (US)

(73) Assignee: KLA Corp., Milpitas, CA (US)

( * ) Notice: Subject to any disclaimer, the term of this patent is extended or adjusted under 35 U.S.C. 154(b) by 179 days.

(21) Appl. No.: 17/094,607

(22) Filed: Nov. 10, 2020

(65) Prior Publication Data

US 2021/0334989 A1 Oct. 28, 2021

Related U.S. Application Data

(60) Provisional application No. 63/016,309, filed on Apr. 28, 2020.

(51) Int. Cl.
*G06T 7/33* (2017.01)
*G06T 5/00* (2006.01)
(Continued)

(52) U.S. Cl.
CPC .............. *G06T 7/337* (2017.01); *G06T 5/002* (2013.01); *G06T 7/74* (2017.01); *G06V 10/25* (2022.01)

(58) Field of Classification Search
CPC .......... G06T 7/337; G06T 5/002; G06T 7/74; G06T 2207/10061; G06T 2207/30148; G06T 7/001; G06T 7/004; G06T 7/62; G06T 5/50; G06T 2207/10016; G06T 3/0068; G06V 10/25; G06V 10/751;
(Continued)

(56) References Cited

U.S. PATENT DOCUMENTS 5,923,430 A * 7/1999 Worster ................. G01N 21/94
356/394
6,763,142 B2 7/2004 Dai et al.
(Continued)

FOREIGN PATENT DOCUMENTS

KR 10-2010-0001133 1/2010

OTHER PUBLICATIONS

Cheng et al., "Image denoising algorithm based on structure and texture part," 2016 12th International Conference on Computational Intelligence and Security, Dec. 2016, IEEE, pp. 147-151.
(Continued)

*Primary Examiner* — Jose L Couso
(74) *Attorney, Agent, or Firm* — Ann Marie Mewherter

(57) ABSTRACT

Methods and systems for aligning images of a specimen are provided. One method includes reducing noise in a test image generated for a specimen by an imaging subsystem thereby generating a denoised test image. The method also includes detecting one or more patterned features in the denoised test image extending in at least a horizontal or vertical direction. In addition, the method includes designating an area of the denoised test image in which the detected one or more patterned features are located as a region of interest in the denoised test image. The method further includes aligning the denoised test image to a reference image for the specimen using only the region of interest in the denoised test image and a corresponding area in the reference image.

20 Claims, 4 Drawing Sheets

(51) Int. Cl.
*G06T 7/73* (2017.01)
*G06V 10/25* (2022.01)

(58) Field of Classification Search
CPC .... G06V 10/30; G06V 10/255; G06K 9/3233; G06K 9/6202; G06K 9/40; G06K 9/3241
See application file for complete search history.

(56) References Cited

U.S. PATENT DOCUMENTS

| | | |
|---|---|---|
| 7,295,695 B1 | 11/2007 | Dayal |
| 7,359,044 B2 | 4/2008 | Nishiyama et al. |
| 8,126,255 B2 | 2/2012 | Bhaskar et al. |
| 8,664,594 B1 | 4/2014 | Jiang et al. |
| 8,692,204 B2 | 4/2014 | Kojima et al. |
| 8,698,093 B1 | 4/2014 | Gubbens et al. |
| 8,716,662 B1 | 5/2014 | MacDonald et al. |
| 9,222,895 B2 | 12/2015 | Duffy et al. |
| 2014/0294284 A1* | 10/2014 | Bryll .......... G06T 7/13 382/152 |
| 2015/0063677 A1* | 3/2015 | Huang .......... G06T 5/002 382/149 |
| 2018/0144442 A1 | 5/2018 | Brauer |
| 2019/0180430 A1* | 6/2019 | Lin .......... G06T 7/001 |
| 2019/0325321 A1* | 10/2019 | Swanson .......... G06K 9/6267 |
| 2021/0263430 A1* | 8/2021 | Adiga .......... G06N 7/005 |

OTHER PUBLICATIONS

Sadek, "SVD Based Image Processing Applications: State of the Art, Contributions, and Research Challenges," (IJACSA) International Journal of Advanced Computer Science and Applications, vol. 3, No. 7, Nov. 2012, pp. 26-34.

International Search Report for PCT/US2021/028265 dated Aug. 6, 2021.

* cited by examiner

IMAGE ALIGNMENT FOR NOISY IMAGES

BACKGROUND OF THE INVENTION

1. Field of the Invention

The present invention generally relates to methods and systems for aligning images of a specimen including particularly noisy specimen images.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on the wafer where defects have been detected by inspection. The higher resolution data for the defects generated by defect review is more suitable for determining attributes of the defects such as profile, roughness, more accurate size information, etc.

Metrology processes are also used at various steps during a semiconductor manufacturing process to monitor and control the process. Metrology processes are different than inspection processes in that, unlike inspection processes in which defects are detected on a wafer, metrology processes are used to measure one or more characteristics of the wafer that cannot be determined using currently used inspection tools. For example, metrology processes are used to measure one or more characteristics of a wafer such as a dimension (e.g., line width, thickness, etc.) of features formed on the wafer during a process such that the performance of the process can be determined from the one or more characteristics. In addition, if the one or more characteristics of the wafer are unacceptable (e.g., out of a predetermined range for the characteristic(s)), the measurements of the one or more characteristics of the wafer may be used to alter one or more parameters of the process such that additional wafers manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a wafer may be independent of the results of an inspection process performed on the wafer. In particular, the locations at which a metrology process is performed may be selected independently of inspection results. In addition, since locations on the wafer at which metrology is performed may be selected independently of inspection results, unlike defect review in which the locations on the wafer at which defect review is to be performed cannot be determined until the inspection results for the wafer are generated and available for use, the locations at which the metrology process is performed may be determined before an inspection process has been performed on the wafer.

One of the challenges in quality control type processes such as those described above is aligning one image to another with sufficient accuracy. Image alignment is commonly performed to align a test image to a reference image so that differences between the test and reference images can be determined. Such differences may then be used for detecting defects in the case of inspection and defect review and determining relative measurements in the case of metrology. Obviously, therefore, if the test and reference images are not accurately aligned, the errors in the alignment can cause errors in the results produced by such processes.

Some currently used methods for image alignment in semiconductor quality control type processes use two raw images and align them directly to each other with normalized cross correlation (NCC). NCC is a statistics based method that computes the correlation between two samples. The simplest form of the NCC is the cosine of the angle between two vectors a and b:

$$NCC = \cos\theta = \frac{a \cdot b}{|a||b|} = \frac{\sum_i a_i b_i}{\sqrt{\sum_i a_i^2}\sqrt{\sum_i b_i^2}}, -1 \le NCC \le 1$$

This method is effective and practical when the template, i.e., reference image, and test image have obvious common features and relatively little noise.

There are however a number of disadvantages to the currently used methods and systems for image alignment. For example, the currently used methods and systems do not consider the influence of noise on the vertical or horizontal features in the images. In addition, in some images, there are only a few horizontal or vertical features, and the alignment position can be misled by the noise.

Accordingly, it would be advantageous to develop systems and methods for aligning images of a specimen that do not have one or more of the disadvantages described above.

SUMMARY OF THE INVENTION

The following description of various embodiments is not to be construed in any way as limiting the subject matter of the appended claims.

One embodiment relates to a system configured for aligning images of a specimen. The system includes an imaging subsystem configured to generate images of a specimen. The system also includes one or more computer subsystems configured for reducing noise in a test image generated for the specimen by the imaging subsystem thereby generating a denoised test image. The one or more computer subsystems are also configured for detecting one or more patterned features in the denoised test image extending in at least a horizontal or vertical direction. In addition, the one or more computer subsystems are configured for designating an area of the denoised test image in which the detected one or more patterned features are located as a region of interest (ROI) in the denoised test image. The one or more computer subsystems are further configured for aligning the denoised test image to a reference image for the specimen using only the ROI in the denoised test image and a corresponding area in the reference image. The system may be further configured as described herein.

Another embodiment relates to a computer-implemented method for aligning images of a specimen. The method includes the reducing noise, detecting one or more patterned features, designating an area, and aligning steps described above. The steps of the method are performed by one or more computer subsystems coupled to an imaging subsystem configured as described above.

Each of the steps of the method described above may be performed as described further herein. The embodiment of the method described above may include any other step(s) of any other method(s) described herein. The method described above may be performed by any of the systems described herein.

Another embodiment relates to a non-transitory computer-readable medium storing program instructions executable on a computer system for performing a computer-implemented method for aligning images of a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
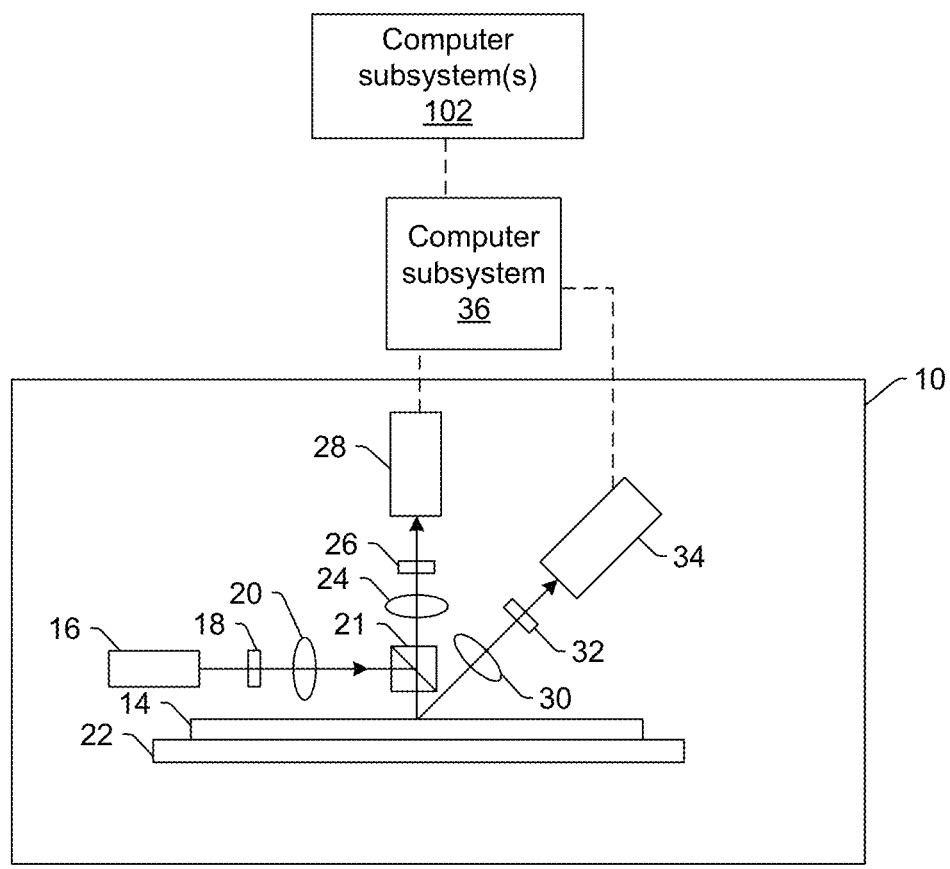
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured for aligning images of a specimen. Some embodiments are related to improving the alignment of images such as scanning electron microscope (SEM) images using denoising and region of interest (ROI) designation. One of the main challenges in the image processing community is image alignment, specifically when the goal is to align two images within sub-pixel accuracy. The problem becomes even more challenging when there are images such as SEM images with repetitive patterned features without any other (or with limited) distinguishable structure. The embodiments described herein introduce new methods and systems for improving image alignment to reach the sub-pixel accuracy.

The embodiments described herein can be used to improve the accuracy of image alignment processes such as between test and reference images including SEM test and reference images. As mentioned above, regularly SEM images are relatively noisy and are preferably aligned within pixel accuracy. One main challenge in image alignment comes from the fact that when there are artifacts (i.e., noise) in the images, features such as edges can become jagged and parallel lines can become distorted. In addition, in some images, there are only a few horizontal or vertical features, and those features can have less weight than noise does in image alignment processes such as normalized cross correlation (NCC). As a result, the chance of having alignment failure increases due to the roughness of the patterned feature edges in the images.

As described further herein, the embodiments provide new approaches for improved image alignment. One approach includes denoising the images using a structure based denoising method. Another approach is to use singular value decomposition (SVD) to achieve the desired result by only preserving the main features of the images. These two approaches can also be combined to further improve the alignment when the computation budget allows it. As also described further herein, the embodiments combine one of the denoising approaches described herein with detecting horizontal or vertical features in the images, setting them to a region of interest (ROI), and using only the ROI as input to the alignment method, e.g., NCC.

In one embodiment, the specimen is a wafer. The wafer may include any wafer known in the semiconductor arts. In another embodiment, the specimen is a reticle. The reticle may include any reticle known in the semiconductor arts. Although some embodiments may be described herein with respect to a wafer or wafers, the embodiments are not limited in the specimen for which they can be used. For example, the embodiments described herein may be used for specimens such as reticles, flat panels, personal computer (PC) boards, and other semiconductor specimens.

One embodiment of such a system is shown in FIG. 1. In some embodiments, the system includes an imaging subsystem configured to generate images of a specimen. The imaging subsystem may include at least an energy source and a detector. The energy source is configured to generate energy that is directed to a specimen. The detector is configured to detect energy from the specimen and to generate output responsive to the detected energy.

In one embodiment, the imaging subsystem is a light-based imaging subsystem. For example, in the embodiment of the system shown in FIG. 1, imaging subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen and the process to be performed on the specimen.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different angle of incidence.

In some instances, the imaging subsystem may be configured to direct light to the specimen at more than one angle of incidence at the same time. For example, the imaging subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser, which may be any suitable laser known in the art and may be configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for imaging.

The imaging subsystem may also include a scanning subsystem configured to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be scanned over the specimen. In addition, or alternatively, the imaging subsystem may be configured such that one or more optical elements of the imaging subsystem perform some scanning of the light over the specimen. The light may be scanned over the specimen in any suitable fashion.

The imaging subsystem further includes one or more detection channels. At least one of the one or more detection channels includes a detector configured to detect light from the specimen due to illumination of the specimen by the imaging subsystem and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the imaging subsystem that includes two detection channels, the imaging subsystem may include a different number of detection channels (e.g., only one detection channel or two or more detection channels). Although each of the collectors are shown in FIG. 1 as single refractive optical elements, each of the collectors may include one or more refractive optical element(s) and/or one or more reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels may be signals or data, but not image signals or image data. In such instances, a computer subsystem such as computer subsystem 36 of the system may be configured to generate images of the specimen from the non-imaging output of the detectors. However, in other instances, the detectors may be configured as imaging detectors that are configured to generate imaging signals or image data. Therefore, the system may be configured to generate images in a number of ways.

It is noted that FIG. 1 is provided herein to generally illustrate a configuration of an imaging subsystem that may be included in the system embodiments described herein. Obviously, the imaging subsystem configuration described herein may be altered to optimize the performance of the system as is normally performed when designing a commercial imaging system. In addition, the systems described herein may be implemented using an existing imaging system (e.g., by adding functionality described herein to an existing inspection system) such as the 29xx and 39xx series of tools that are commercially available from KLA. For some such systems, the embodiments described herein may be provided as optional functionality of the imaging system (e.g., in addition to other functionality of the imaging system). Alternatively, the imaging subsystem described herein may be designed "from scratch" to provide a completely new imaging system.

Computer subsystem 36 of the system may be coupled to the detectors of the imaging subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, the different computer subsystems may be coupled to each other such that images, data, information, instructions, etc. can be sent between the computer subsystems. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based subsystem, in another embodiment, the imaging subsystem is an electron-based imaging subsystem. For example, in one embodiment, the energy directed to the specimen includes electrons, and the energy detected from the specimen includes electrons. In this manner, the energy source may be an electron beam source. In one such embodiment shown in FIG. 2, the imaging subsystem includes electron column 122, which is coupled to computer subsystem 124.

Figure 2:
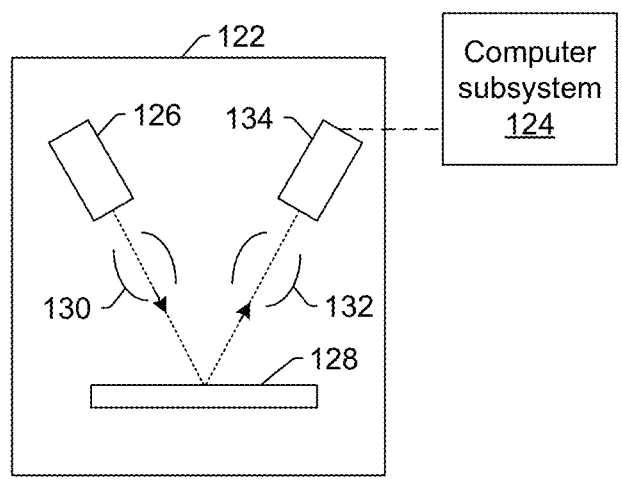

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam subsystem may be configured to use multiple modes to generate images of the specimen (e.g., with different illumination angles, collection angles, etc.). The multiple modes of the electron beam subsystem may be different in any image generation parameter(s) of the subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform any of the functions described herein using the output of the detector and/or the electron beam images. Computer subsystem 124 may be configured to perform any additional step(s) described herein. A system that includes the imaging subsystem shown in FIG. 2 may be further configured as described herein.

It is noted that FIG. 2 is provided herein to generally illustrate a configuration of an electron-based imaging subsystem that may be included in the embodiments described herein. As with the optical subsystem described above, the electron beam subsystem configuration described herein may be altered to optimize the performance of the subsystem as is normally performed when designing a commercial imaging system. In addition, the systems described herein may be implemented using an existing imaging system (e.g., by adding functionality described herein to an existing imaging system). For some such systems, the embodiments described herein may be provided as optional functionality of the system (e.g., in addition to other functionality of the system). Alternatively, the system described herein may be designed "from scratch" to provide a completely new system.

Although the imaging subsystem is described above as being a light-based or electron beam-based subsystem, the imaging subsystem may be an ion beam-based subsystem. Such an imaging subsystem may be configured as shown in FIG. 2 except that the electron beam source may be replaced with any suitable ion beam source known in the art. In one embodiment, therefore, the energy directed to the specimen includes ions. In addition, the imaging subsystem may be any other suitable ion beam-based imaging subsystem such as those included in commercially available focused ion beam (FIB) systems, helium ion microscopy (HIM) systems, and secondary ion mass spectroscopy (SIMS) systems.

The imaging subsystems described herein may be configured to generate output, e.g., images, of the specimen with multiple modes. In general, a "mode" is defined by the values of parameters of the imaging subsystem used for generating images of a specimen (or the output used to generate images of the specimen). Therefore, modes may be different in the values for at least one of the parameters of the imaging subsystem (other than position on the specimen at which the output is generated). For example, in an optical subsystem, different modes may use different wavelength(s) of light for illumination. The modes may be different in the illumination wavelength(s) as described further herein (e.g., by using different light sources, different spectral filters, etc. for different modes). In another example, different modes may use different illumination channels of the optical subsystem. For example, as noted above, the optical subsystem may include more than one illumination channel. As such, different illumination channels may be used for different modes. The modes may also or alternatively be different in one or more collection/detection parameters of the optical subsystem. The modes may be different in any one or more alterable parameters (e.g., illumination polarization(s), angle(s), wavelength(s), etc., detection polarization(s), angle(s), wavelength(s), etc.) of the imaging subsystem. The imaging subsystem may be configured to scan the specimen with the different modes in the same scan or different scans, e.g., depending on the capability of using multiple modes to scan the specimen at the same time.

In a similar manner, the output generated by the electron beam subsystem may include output, e.g., images, generated by the electron beam subsystem with two or more different values of a parameter of the electron beam subsystem. The multiple modes of the electron beam subsystem can be defined by the values of parameters of the electron beam subsystem used for generating output and/or images for a specimen. Therefore, modes may be different in the values for at least one of the electron beam parameters of the electron beam subsystem. For example, different modes may use different angles of incidence for illumination.

The subsystems described herein and shown in FIGS. 1 and 2 may be modified in one or more parameters to provide different imaging capability depending on the application for which they will be used. In one such example, the imaging subsystem shown in FIG. 1 may be configured to have a higher resolution if it is to be used for defect review or metrology rather than for inspection. In other words, the embodiments of the imaging subsystems shown in FIGS. 1 and 2 describe some general and various configurations for an imaging subsystem that can be tailored in a number of manners that will be obvious to one skilled in the art to produce imaging subsystems having different output generation capabilities that are more or less suitable for different applications.

As noted above, the optical, electron, and ion beam subsystems are configured for scanning energy (e.g., light, electrons, etc.) over a physical version of the specimen thereby generating images for the physical version of the specimen. In this manner, the optical, electron, and ion beam subsystems may be configured as "actual" subsystems, rather than "virtual" subsystems. However, a storage medium (not shown) and computer subsystem(s) 102 shown in FIG. 1 may be configured as a "virtual" system. In particular, the storage medium and the computer subsystem(s) may be configured as a "virtual" imaging system as described in commonly assigned U.S. Pat. No. 8,126,255 issued on Feb. 28, 2012 to Bhaskar et al. and 9,222,895 issued on Dec. 29, 2015 to Duffy et al., both of which are incorporated by reference as if fully set forth herein. The embodiments described herein may be further configured as described in these patents.

Figure 3:
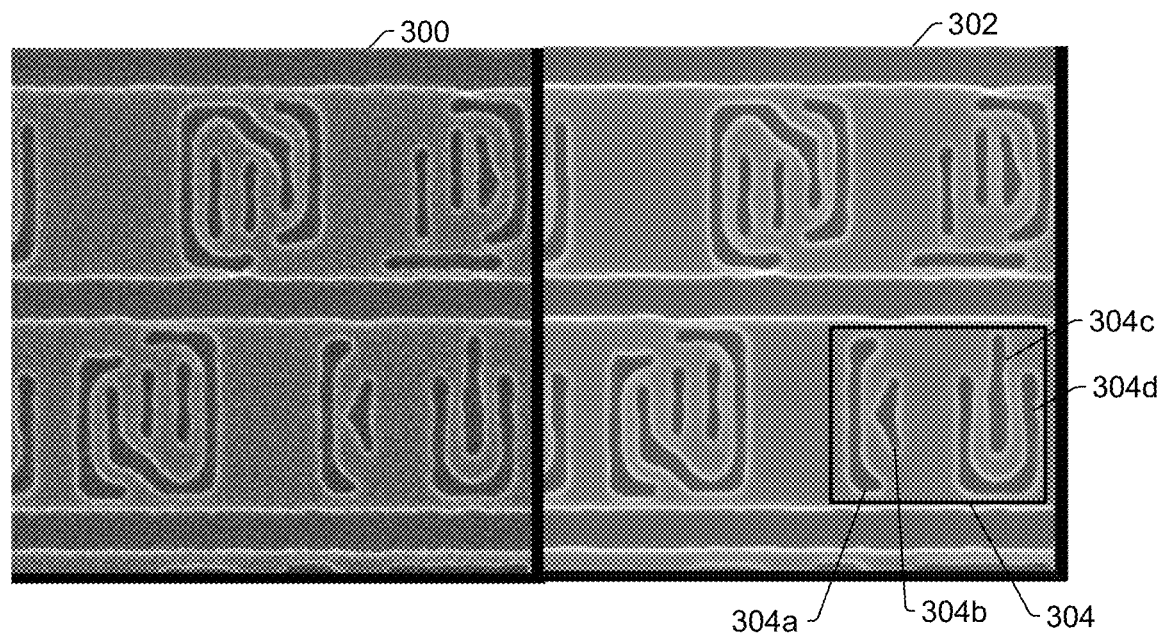
FIG. 3 includes an example of a test image before and after denoising.

The one or more computer subsystems are configured for reducing noise in a test image generated for the specimen by the imaging subsystem thereby generating a denoised test image. FIG. 3 shows an example of an image before and after denoising. In particular, image 300 is an original SEM test image and image 302 is the denoised version of that SEM test image. As can be seen by comparing images 300 and 302, the edges of patterned features in the denoised image are much smoother after denoising. In addition, the denoising has reduced the noise in unpatterned parts of the image (e.g., the relatively large spaces between patterned features) as well as made the image brighter and with increased contrast between features and background in the image. Any and all of these changes will make image alignment as described herein easier and more accurate. Although the images in FIG. 3 show a particular number, arrangement, type, orientation, shape, etc. of patterned features, the embodiments described herein are not limited in the types of images, patterned features in the images, types of specimens, etc. for which they can be used. In other words, the embodiments described herein are not limited in the images and specimens for which they may be used.

In some embodiments, the test image includes repetitive patterned features. For example, as shown in FIG. 3, certain of the patterned features in original test image 300 repeat within the image. As described above, image alignment can be more challenging when there are repetitive features, without having any other (or limited) distinguishable features. In the case of the test image example shown in FIG. 3, there is at least one patterned feature in the test image that is distinguishable from all other patterned features in the image. However, some images that have to be aligned to one another for the processes described herein are not guaranteed to have even one feature that is distinguishable from other patterned features in the images. The embodiments described herein however can be used to align images with few or even no patterned features that are unique with respect to other patterned features in the images.

In one embodiment, reducing the noise includes structure based denoising. The term "structure based denoising" as used herein is a general term used to refer to image denoising based on and preserving structures visible in the images. One embodiment of a suitable structure based denoising method that can be used for reducing the noise in the images described herein is the block-matching and 3D filtering (BM3D) algorithm. Generally, the BM3D algorithm groups image fragments based on similarity. Image fragments do not need to be disjoint but do have to have the same size. Whether or not a fragment is grouped may be determined by applying a threshold to its dissimilarity to a reference fragment. This grouping technique is commonly referred to as block-matching. BM3D may however group macroblocks within a single frame, and then all image fragments in a group are stacked to form 3D cylinder-like shapes. BM3D may then include filtering performed on every fragment group followed by a linear transform. A transform-domain shrinkage step such as Wiener filtering may then be performed followed by inverting the linear transform to reproduce all (filtered) fragments. The image is then transformed back to its 2D form. In addition, all overlapping image fragments can be weight-averaged to ensure that they are filtered for noise yet retain their distinct signal. The structure based denoising may be further performed as described by Cheng et al. in "Image denoising algorithm based on structure and texture part," 2016 12th International Conference on Computational Intelligence and Security, December 2016, IEEE, pp. 147-151, which is incorporated by reference as if fully set forth herein. The embodiments described herein may be further configured as described in this reference.

In another embodiment, reducing the noise includes singular value decomposition. Singular value decomposition (SVD) may be used to preprocess the images, e.g., SEM images, and therefore improve the success rate of alignment. SVD decomposes a matrix into orthogonal components with which optimal sub-rank approximations can be obtained. The largest object components in an image found using SVD generally correspond to eigen-images associated with the largest singular values, while image noise corresponds to eigen-images associated with the smallest singular values. Therefore, SVD can be a particularly useful tool for separating noise from patterned feature images in the embodiments described herein.

Figure 6:
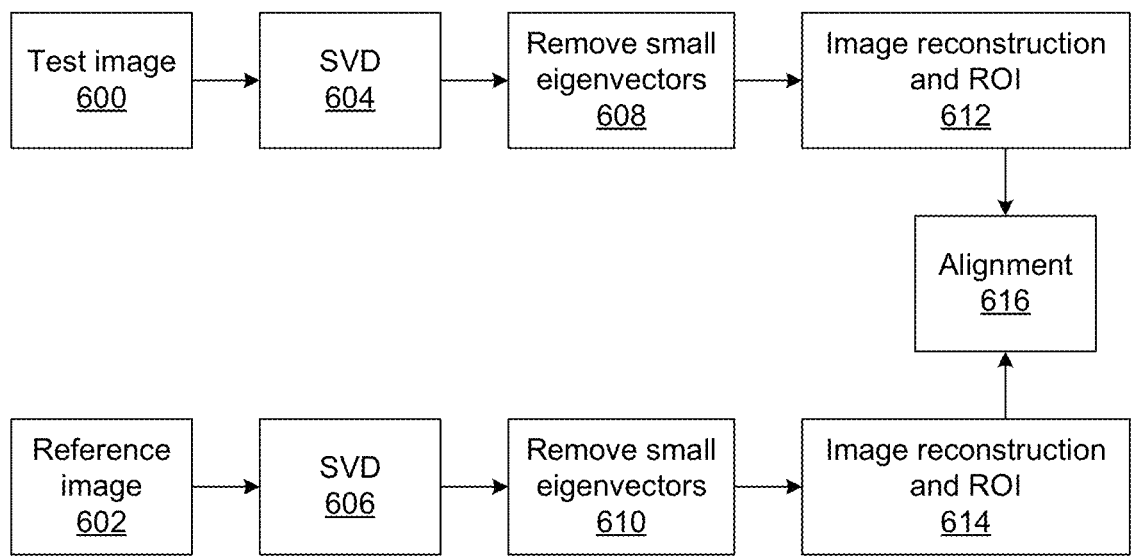

In some embodiments, reducing the noise includes SVD, selecting a predetermined number of eigenvectors having the largest values in one or more matrices output by the SVD, and reconstructing the test image from the selected eigenvectors thereby generating the denoised test image. In one such embodiment, as shown in FIG. 6, test image 600 and reference image 602 may be input to separate SVD steps 604 and 606, respectively. In these steps, each input image may be decomposed into left, right, and diagonal matrices. The output of each SVD step may be input to a remove small eigenvectors step. For example, output of SVD step 604 may be input to remove small eigenvectors step 608 and output of SVD step 606 may be input to remove small eigenvectors step 610. In the remove small eigenvectors steps, only a few (e.g., 10) of the largest eigenvectors (EgV) may be kept and the rest may be removed. In this manner, relatively small unnecessary features which can have negative impacts on the alignment of the images may be removed.

Afterwards, the one or more computer subsystems may reconstruct the images, which only contain the relatively large main structures, and then feed them into the main alignment method. For example, as shown in FIG. 6, output of remove small eigenvectors step 608 may be input to image reconstruction and ROI step 612, and output of remove small eigenvectors step 610 may be input to image reconstruction and ROI step 614. Image reconstruction may be performed as described above and ROI identification and designation may be performed as described further herein. The output of the image reconstruction and ROI steps may be input to alignment step 616, which may be performed as described further herein. In this manner, the embodiments described herein may employ SVD to remove the edge roughness and noise in images such as SEM images before applying an alignment method or algorithm to the images.

In a further embodiment, reducing the noise includes structure based denoising followed by singular value decomposition. For example, the input images shown in FIG. 6, i.e., test image 600 and reference image 602, may be images that have been previously denoised by structure based denoising performed according to any of the embodiments described herein. In this manner, when the computation budget allows for it, the structure based denoising can be combined with the SVD to improve the alignment further than either denoising method provides alone.

The one or more computer subsystems are also configured for detecting one or more patterned features in the denoised test image extending in at least a horizontal or vertical direction. "Extending in at least a horizontal or vertical direction" as that phrase is used herein is intended to mean that the patterned feature(s) have some extended lateral dimension in either of these directions. For example, a line or trench on a specimen such as a wafer would be considered a patterned feature that extends in at least one direction while a contact hole or other circular or square structure would not be considered a patterned feature that extends in at least a horizontal or vertical direction. In this manner, in general, a "patterned feature extending in at least a horizontal or vertical direction" may be a patterned feature that has one dimension in either the x or y direction of the specimen that is larger than another dimension of the patterned feature extending in the opposite direction. A "patterned feature extending in at least a horizontal or vertical direction" may also be a patterned feature whose entirety does not extend in at least a horizontal or vertical direction (e.g., as when not all portions of a patterned feature extend in the same direction) and/or that extends in both the horizontal and vertical directions (e.g., as when one portion of a patterned feature extends in a horizontal direction and another portion of the patterned feature extends in a vertical direction).

Some examples of different patterned features that extend in at least a horizontal or vertical direction are shown in area 304 of denoised test image 302 in FIG. 3. In particular, patterned feature 304a extends in the vertical direction but not the horizontal direction. Patterned feature 304b extends in the vertical direction and may or may not be considered to extend in the horizontal direction. Patterned feature 304c extends only in the vertical direction, and patterned feature 304d extends in the vertical direction, then in the horizontal direction, and then again in the vertical direction as one traverses across this patterned feature. All of these patterned features may be determined to extend in at least a horizontal or vertical direction by the embodiments described herein.

The patterned features extending in at least a horizontal direction (i.e., "horizontal patterned features") or a vertical direction (i.e., "vertical patterned features") may be detected in any suitable manner such as gray level based thresholding, image projection, etc. The horizontal and/or vertical patterned features may be detected in the denoised test image using the denoised test image itself, e.g., by inputting the denoised test image to the detecting step. Detecting the horizontal and/or vertical patterned features may be important for identifying features that are suitable for use in the aligning step described herein. Whether horizontal and/or vertical features are detected and used for aligning as described herein may vary depending on the specimen, what patterned features are formed on it in the imaged area on the specimen, and possibly the image alignment algorithm (e.g., when there are both horizontal and vertical patterned features, which one(s) are detected and used for alignment may depend on which types of features are useful to the alignment algorithm; when an alignment algorithm performs better on patterned features that extend in only the horizontal or vertical direction, rather that both directions; etc.).

The one or more computer subsystems are further configured for designating an area of the denoised test image in which the detected one or more patterned features are located as a region of interest (ROI) in the denoised test image. The ROI in the denoised test image may include only a single contiguous area in the denoised test image. For example, in the denoised test image shown in FIG. 3, area 304 containing patterned features 304a, 304b, 304c, and 304d that extend in at least the horizontal or vertical direction may be designated as an ROI by the one or more computer subsystems. Alternatively, the ROI may include more than one area, some of which are discrete or mutually exclusive from each other. For example, horizontal and/or vertical patterned features may be found in the denoised test image at various locations depending on the design for the specimen in the imaged area. Therefore, for some imaged areas, it may not be possible or advantageous to designate a single, contiguous area of the denoised test image in which all (or a sufficient number) of the horizontal and/or vertical patterned features are located, e.g., without also including patterned features or areas of the denoised test image that are not useful for (or even detrimental to) alignment.

In some such instances, then, the designated ROI may be defined as an area that includes fewer than all of the detected horizontal and/or vertical patterned features. In other such instances, more than one designated ROI may be defined, and each of the designated ROIs may include different subsets of the horizontal and/or vertical patterned features. Furthermore, in some instances, there may be patterned features that do not extend in the horizontal or vertical direction in the vicinity of other patterned features that do. In such instances, if it makes sense computationally, those non-horizontal and/or vertical patterned features may be included in an ROI along with horizontal and/or vertical patterned features. In general, therefore, the embodiments described herein may designate the ROI as any area in the denoised test image that includes at least one horizontal and/or vertical patterned feature, not all of the horizontal and/or vertical patterned features detected in the denoised test image may be included in the ROI, and the ROI may include some patterned features that are not horizontal and/or vertical patterned features.

The one or more computer subsystems are also configured for aligning the denoised test image to a reference image for the specimen using only the ROI in the denoised test image and a corresponding area in the reference image. By aligning the denoised test image to the reference image, the computer subsystem(s) effectively align the original test image to the reference image. Designating the ROI and using only the ROI for the aligning step can be important for achieving the accuracy of the image alignment that is desired. For example, the denoising methods described herein may not be able to remove all of the noise in all of the test images that may be selected for image alignment. Using only the ROI for image alignment can reduce the impact of the remaining noise and thereby improve the accuracy of the image alignment.

In some embodiments, aligning the denoised test image to the reference image aligns the test image to the reference image with sub-pixel accuracy. "Sub-pixel" as that term is used herein is generally defined as smaller than a pixel of output generated by an imaging subsystem. In this manner, "sub-pixel accuracy" as that term is used herein can be generally defined as the determination of something (e.g. image alignment) with an error smaller than the size (distance from one side to the other) of a single pixel in an image acquired by the imaging subsystem. The denoising step(s), designated ROIs, and performing alignment using only the designated ROIs described herein enable the image to alignment to be performed with sub-pixel accuracy. In other words, the denoising step(s), designating a ROI step, and aligning step can be performed as described herein to thereby align test and reference images with sub-pixel accuracy.

In a further embodiment, aligning the denoised test image to the reference image includes normalized cross-correlation. NCC may be performed as described further herein or in any other manner known in the art. Although NCC may be commonly used by some of the systems and methods described herein to perform the actual aligning step, the aligning described herein may be performed using any other correlation type algorithm or method known in the art. In other words, although NCC is one particularly suitable way to align the test and reference images described herein, the denoised test and reference images along with their designated ROIs may be input to any suitable alignment method or algorithm for the aligning step described herein.

In some embodiments, a majority of the patterned features extending in at least the horizontal or vertical direction in the test image have less weight in NCC than noise in the test image. For example, the embodiments described herein may be particularly advantageous for aligning images that are so noisy and/or contain so few patterned features suitable for alignment that the alignment method relies more heavily on the noise in the images than the patterned feature images. In particular, by denoising the test image as described herein, designating an ROI in the denoised test image in which patterned features suitable for use in alignment are located, and using only the ROI for alignment, the embodiments described herein make image alignment substantially accurate (e.g., with sub-pixel accuracy) even in the presence of significant test image noise and/or few or minimal patterned features suitable for alignment.

The reference images used in the embodiments described herein may be different types of reference images depending on the application for which they are being used. Some reference images are generated from the specimen for which the process is being performed. In one embodiment, the reference image is a denoised reference image, an initial reference image is generated for the specimen by the imaging subsystem at a location on the specimen corresponding to a location at which the test image is generated, and the one or more computer subsystems are configured for reducing noise in the initial reference image prior to the aligning thereby generating the denoised reference image. In one such example, test and reference images may be acquired in different, adjacent dies on a specimen and at roughly corresponding locations within those different dies. When the test and reference images are both acquired using the specimen, both the test and reference images may exhibit relatively similar levels of noise. Therefore, if the test image is being denoised for alignment purposes as described herein, chances are that it is also beneficial to denoise the reference image for alignment purposes. In such instances, both the test and reference images may be denoised in the same way using the same parameters (which may be suitable due to the relatively similar levels or types of noise in the images). Such denoising of both the test and reference images may be further performed as described herein and shown in FIGS. 4-6.

In another embodiment, the reference image is not generated using the specimen. For example, in some applications described herein, the reference image may be generated in a way that does not involve imaging the specimen. In one such example, the reference image may be an image rendered from a design for the specimen that simulates how the reference image would appear if it were generated by imaging the specimen. The design for the specimen may include any suitable design data or information such as a graphical data stream (GDS) file. In another example, the reference image may be generated from another specimen on which the same design is printed.

In this manner, the reference image that is used in the embodiments described herein may or may not exhibit the same types and levels of noise as the test image. For example, a reference image that is rendered from a design for the specimen may not have the same types and levels of noise as the test image and as a result, denoising of such a reference image may not need to be performed to achieve the image alignment accuracy described herein. In other instances, a reference image generated from another specimen of the same design may have relatively similar levels and types of noise as the test image, and so denoising may be performed on such a reference image for alignment purposes.

In some instances, the system or method that generates the reference image may perform the denoising of the reference image thereby making denoising of the reference image by the embodiments described herein unnecessary. For example, rendering the reference image may be performed by another system or method, and that other system or method may denoise the reference image prior to making it available for use by the embodiments described herein. Therefore, the embodiments described herein may be able to use the reference image without any additional denoising.

In some embodiments, the reference image is a denoised reference image, an initial reference image is not generated using the specimen, and the one or more computer subsystems are configured for reducing noise in the initial reference image prior to the aligning thereby generating the denoised reference image. For example, the embodiments described herein may be configured for generating a reference image without using the physical specimen itself as described above (e.g., by rendering the reference image from a design, by acquiring the reference image using another specimen of the same design, etc.). Generating a reference image in such a manner may otherwise be performed in any suitable manner known in the art. In some such instances, then, the reference image may be generated prior to imaging of the specimen and generation of test images used by the embodiments described herein. Therefore, if such a reference image is particularly noisy, it may be denoised as described herein prior to imaging of the specimen performed to generate the test images. In this manner, denoising the reference image may be performed during a setup phase rather than a runtime phase when the reference image is not generated from the test specimen. Denoising the reference image may however also be performed during a setup phase rather than a runtime phase even when the reference image is generated using the test specimen.

Figure 4:
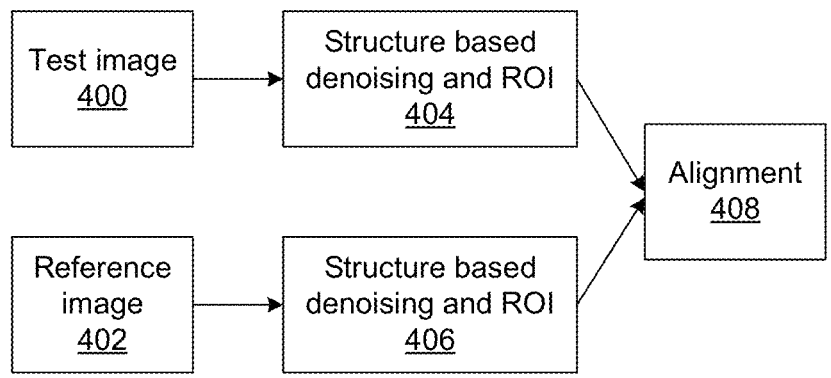
FIGS. 4-6 are flow charts illustrating embodiments of steps that may be performed by the one or more computer subsystems described herein for aligning images of a specimen.

In one embodiment, the reference image is a denoised reference image, an initial reference image is generated for the specimen by the imaging subsystem at a location on the specimen corresponding to a location at which the test image is generated, the one or more computer subsystems are configured for reducing noise in the initial reference image prior to the aligning thereby generating the denoised reference image, and reducing the noise in the test image and reducing the noise in the initial reference image includes structure based denoising performed separately for the test image and the initial reference image. One such embodiment is shown in FIG. 4. As shown in FIG. 4, test image 400 and reference image 402 may be separately fed into different structure based denoising and ROI steps 404 and 406, respectively. The structure based denoising and ROI steps may both be performed as described further herein. The denoised test and reference images with the ROIs identified therein may then be input to alignment step 408. The alignment may be performed in step 408 as described further herein. In this relatively simple embodiment, therefore, the system performs structure based denoising on the two images separately before feeding them into the main alignment step.

Figure 5:
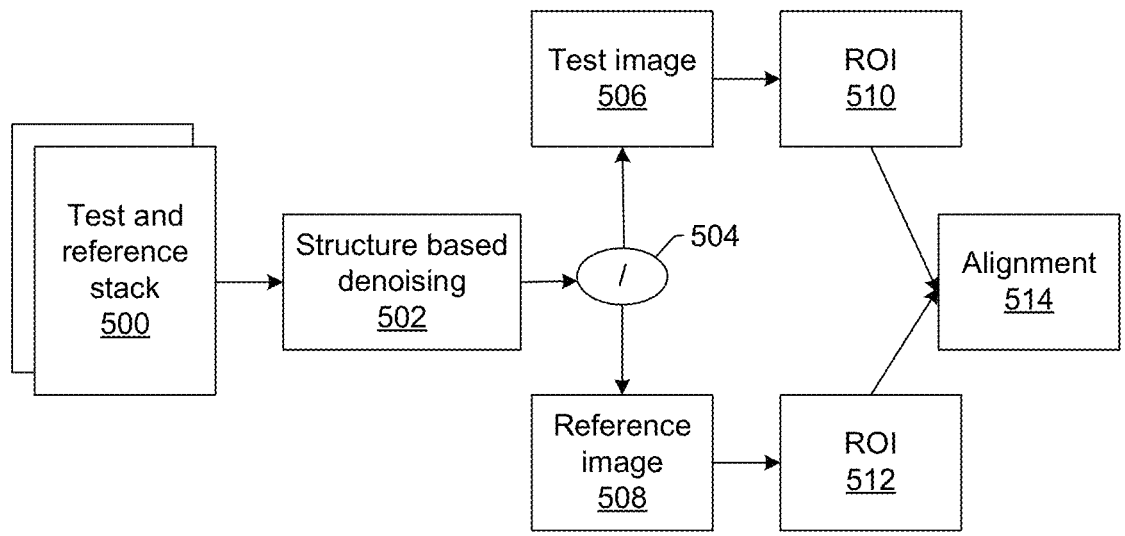

In a further embodiment, the reference image is a denoised reference image, an initial reference image is generated for the specimen by the imaging subsystem at a location on the specimen corresponding to a location at which the test image is generated, the one or more computer subsystems are configured for reducing noise in the initial reference image prior to the aligning thereby generating the denoised reference image, and reducing the noise in the test image and reducing the noise in the initial reference image includes simultaneously inputting the test image and the initial reference image into structure based denoising. In this embodiment, therefore, the computer subsystem(s) may generate a "stack" from the test and reference images before performing structure based denoising on them. For example, as shown in FIG. 5, the computer subsystem(s) may generate test and reference stack 500 and input the stack of images to structure based denoising step 502. "Stacking" the images as that term is used herein does not include combining or changing the images in any way. Instead, "stacking" as that term is used herein is meant to indicate that multiple images are fed simultaneously into a denoising algorithm as different images in different input channels. This denoising step may be performed as described further herein. In this manner, the computer subsystem(s) may employ structure based denoising on a stack of test and reference images before separating them for the main alignment method.

After the denoising, the images can be separated again and then fed into the alignment process. In one such embodiment, the structure based denoising simultaneously outputs the denoised test image and the denoised reference image, and the one or more computer subsystems are configured for separating the denoised test image and the denoised reference image prior to the detecting. For example, as shown in FIG. 5, the output of structure based denoising 502 may be input to splitting step 504 in which denoised test image 506 is separated from denoised reference image 508. ROI identification may then be performed separately on denoised test and reference images 506 and 508 in ROI identification steps 510 and 512, respectively. The denoised test and reference images and their identified ROIs can then be input to alignment step 514, which may be performed as described further herein.

The computer subsystem(s) may be configured for storing the results of the alignment step in any suitable computer-readable storage medium. The results may be stored with any of the other results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

In one such example, the embodiments described herein may be configured for performing an inspection process for the specimen. In this manner, the (original and/or denoised) test and reference images that have been aligned to each other may be input to a defect detection method or algorithm by the embodiments described herein. One example of such a defect detection method or algorithm may include subtracting the reference image from the denoised test image to which it has been aligned to thereby generate a difference image and then applying a defect detection threshold to the difference image. For example, image signals or data in the difference image that are above the threshold may be designated as defects or potential defects and image signals or data in the difference image that are not above the threshold may not be designated as defects or potential defects. Of course, this is just a simple example of a defect detection method or algorithm that may use the results of the alignment step described herein. In general, any defect detection method or algorithm that relies on alignment between a test image and a reference image may use the output of the alignment step described herein for inspection.

Different inspection tools may use different defect detection methods and algorithms. Some examples of defect detection algorithms that are used by inspection tools that are commercially available from KLA include the multi-die adaptive threshold (MDAT) algorithm, which performs candidate to reference image comparisons by image frame subtraction and identifies outliers based on signal-to-noise through double detection (compares a candidate image to two reference images) or single detection when compared to a median reference frame of more than two frames. Another such defect detection algorithm includes the multi-computed die adaptive threshold (MCAT) algorithm, which is similar to the MDAT algorithm but optimizes the reference to be similar to the test image frame before image subtraction is performed. An additional such defect detection algorithm includes the MCAT+ algorithm, which is an algorithm similar to MCAT but uses references from across the wafer. A further such defect detection algorithm is the single reference die (SRD) defect detection algorithm, which uses a reference die from the same or different wafer as a reference (for subtraction from test images).

The defect detection method may also be a one-dimensional (1D) or two-dimensional (2D) version of any of these defect detection methods. A defect detection method that generates a 1D histogram for the detector output may be referred to as a "1D defect detection method." In one such embodiment, the 1D histogram is generated from grey levels in difference images generated from the aligned images. For example, a 1D defect detection method or algorithm may use a 1D histogram for outlier detection with the difference grey level on the x axis. The 1D histogram may therefore show defect count over the difference grey level. In contrast, a "2D defect detection algorithm" as that term is used herein is an algorithm that uses a 2D histogram with one axis being, for example, the median grey level of n>1 reference frames (y axis) and the x axis being the difference grey level of difference images generated from the images aligned as described herein.

In another such example, the embodiments described herein may be configured for performing a metrology process for the specimen. In this manner, the (original and/or denoised) test and reference images that have been aligned to each other may be input to a measurement method or algorithm, which may be performed by the embodiments described herein. Aligning images to each other may be performed during metrology to determine relative characteristics such as relative critical dimension (CD) of features in a test image compared to features in a reference image. In this manner, the differences between features in test and reference images can be determined, which for metrology purposes can be used to monitor the performance of a process performed on the specimen, can be used to identify a problem in such a fabrication process, can be used to determine corrections to such a fabrication process, etc. Such processes and corrections are described further herein.

In a further example, the embodiments described herein may be configured for performing a defect review process for the specimen. In this manner, the (original and/or denoised) test and reference images that have been aligned to each other as described herein may be used for re-detecting defects detected in inspection and possibly determining additional information for the defects, which may be performed by the embodiments described herein. For example, once a defect has been redetected by subtracting a reference image from a test image aligned thereto, the portion of the test image corresponding to the defect may be used to determine additional information for the defect than has been determined by inspection and/or information determined at a higher resolution than that which has been determined by inspection. In one such example, since defect review images are generated at a higher resolution than inspection images, more accurate and/or detailed information can be determined by defect review compared to inspection. The defect information that can be determined from the test images described herein may also be more accurate and/or detailed since the denoised test images can be used for this purpose. In some instances, it may also be useful to use both the original test image and the denoised test image to determine one or more characteristics of a defect redetected by review.

Results and information generated by performing a process for the specimen based on the images aligned as described herein may be used in a variety of manners by the embodiments described herein and/or other systems and methods. Such functions include, but are not limited to, altering a process such as a fabrication process or step that was or will be performed on the specimen or another specimen in a feedback or feedforward manner. For example, the computer subsystem(s) may be configured to use the detected defect(s), measurements, reviewed defects, etc. to determine one or more changes to a process that was performed on a specimen inspected, measured, defect reviewed, etc. as described herein and/or a process that will be performed on the specimen. The changes to the process may include any suitable changes to one or more parameters of the process. The computer subsystem(s) preferably determine those changes such that the defects can be reduced or prevented on other specimens on which the revised process is performed, the defects and/or measurements can be corrected on the specimen in another process performed on the specimen, the defects and/or measurements can be compensated for in another process performed on the specimen, etc. The computer subsystem(s) may determine such changes in any suitable manner known in the art.

Those changes can then be sent to a semiconductor fabrication system (not shown) or a storage medium (not shown) accessible to the computer subsystem(s) and the semiconductor fabrication system. The semiconductor fabrication system may or may not be part of the system embodiments described herein. For example, the other computer subsystem(s) and/or imaging subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein provide a number of advantages over previously used methods and systems for image alignment. For example, the embodiments described herein make image alignment possible on relatively noisy images such as SEM images that previously had a relatively poor performance using older alignment methods. Achieving better image alignment on noisy images is made possible by employing the structure based denoising and/or SVD described herein. In another example, the embodiments described herein can close the gap in the current image alignment, e.g., current SEM image alignment, when the test and reference images have less obvious common features and/or have noise. The embodiments described herein are able to outperform older alignment methods on images with a relatively limited number of structures by detecting horizontal and/or vertical features and setting them to the ROI as the input to the alignment step, which may include NCC or some other appropriate alignment method or algorithm.

Each of the embodiments of each of the systems described above may be combined together into one single embodiment.

Another embodiment relates to a computer-implemented method for aligning images of a specimen. The method includes the reducing noise, detecting one or more patterned features, designating an area, and aligning steps described above.

Each of the steps of the method may be performed as described further herein. The method may also include any other step(s) that can be performed by the imaging subsystem and/or computer subsystem(s) or system(s) described herein. The reducing noise, detecting one or more patterned features, designating an area, and aligning steps are performed by one or more computer subsystems coupled to an imaging subsystem, all of which may be configured according to any of the embodiments described herein. In addition, the method described above may be performed by any of the system embodiments described herein.

Figure 7:
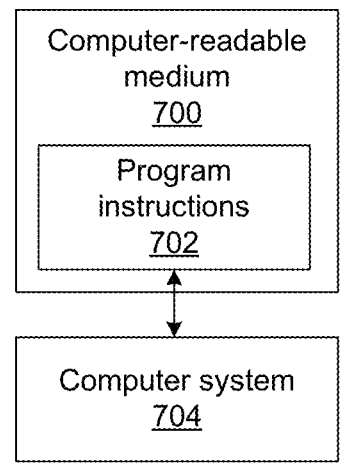
FIG. 7 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for aligning images of a specimen. One such embodiment is shown in FIG. 7. In particular, as shown in FIG. 7, non-transitory computer-readable medium 700 includes program instructions 702 executable on computer system 704. The computer-implemented method may include any step(s) of any method(s) described herein.

Program instructions 702 implementing methods such as those described herein may be stored on computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 704 may be configured according to any of the embodiments described herein.

Further modifications and alternative embodiments of various aspects of the invention will be apparent to those skilled in the art in view of this description. For example, methods and systems for aligning images of a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured for aligning images of a specimen, comprising:
    an imaging subsystem configured to generate images of a specimen; and
    one or more computer subsystems configured for:
        reducing noise in a test image generated for the specimen by the imaging subsystem thereby generating a denoised test image;
        detecting one or more patterned features in the denoised test image extending in at least a horizontal or vertical direction;
        designating an area of the denoised test image in which the detected one or more patterned features are located as a region of interest in the denoised test image; and
        aligning the denoised test image to a reference image for the specimen using only the region of interest in the denoised test image and a corresponding area in the reference image.

2. The system of claim 1, wherein the reference image is a denoised reference image, wherein an initial reference image is generated for the specimen by the imaging subsystem at a location on the specimen corresponding to a location at which the test image is generated, and wherein the one or more computer subsystems are further configured for reducing noise in the initial reference image prior to said aligning thereby generating the denoised reference image.

3. The system of claim 1, wherein the reference image is not generated using the specimen.

4. The system of claim 1, wherein the reference image is a denoised reference image, wherein an initial reference image is not generated using the specimen, and wherein the one or more computer subsystems are further configured for reducing noise in the initial reference image prior to said aligning thereby generating the denoised reference image.

5. The system of claim 1, wherein said reducing noise comprises structure based denoising.

6. The system of claim 1, wherein the reference image is a denoised reference image, wherein an initial reference image is generated for the specimen by the imaging subsystem at a location on the specimen corresponding to a location at which the test image is generated, wherein the one or more computer subsystems are further configured for reducing noise in the initial reference image prior to said aligning thereby generating the denoised reference image, and wherein said reducing noise in the test image and said reducing noise in the initial reference image comprises structure based denoising performed separately for the test image and the initial reference image.

7. The system of claim 1, wherein the reference image is a denoised reference image, wherein an initial reference image is generated for the specimen by the imaging subsystem at a location on the specimen corresponding to a location at which the test image is generated, wherein the one or more computer subsystems are further configured for reducing noise in the initial reference image prior to said aligning thereby generating the denoised reference image, and wherein said reducing noise in the test image and said reducing noise in the initial reference image comprises simultaneously inputting the test image and the initial reference image into structure based denoising.

8. The system of claim 7, wherein the structure based denoising simultaneously outputs the denoised test image and the denoised reference image, and wherein the one or more computer subsystems are further configured for separating the denoised test image and the denoised reference image prior to said detecting.

9. The system of claim 1, wherein said reducing noise comprises singular value decomposition.

10. The system of claim 1, wherein said reducing noise comprises singular value decomposition, selecting a predetermined number of eigenvectors having the largest values in one or more matrices output by the singular value decomposition, and reconstructing the test image from the selected eigenvectors thereby generating the denoised test image.

11. The system of claim 1, wherein said reducing noise comprises structure based denoising followed by singular value decomposition.

12. The system of claim 1, wherein said aligning the denoised test image to the reference image aligns the test image to the reference image with sub-pixel accuracy.

13. The system of claim 1, wherein said aligning comprises normalized cross-correlation.

14. The system of claim 1, wherein a majority of patterned features extending in at least the horizontal or vertical direction in the test image have less weight in normalized cross-correlation than noise in the test image.

15. The system of claim 1, wherein the test image comprises repetitive patterned features.

16. The system of claim 1, wherein the specimen is a wafer.

17. The system of claim 1, wherein the imaging subsystem is a light-based imaging subsystem.

18. The system of claim 1, wherein the imaging subsystem is an electron-based imaging subsystem.

19. A non-transitory computer-readable medium, storing program instructions executable on a computer system for performing a computer-implemented method for aligning images of a specimen, wherein the computer-implemented method comprises:
reducing noise in a test image generated for a specimen by an imaging subsystem thereby generating a denoised test image;
detecting one or more patterned features in the denoised test image extending in at least a horizontal or vertical direction;
designating an area of the denoised test image in which the detected one or more patterned features are located as a region of interest in the denoised test image; and
aligning the denoised test image to a reference image for the specimen using only the region of interest in the denoised test image and a corresponding area in the reference image, wherein said reducing, detecting, designating, and aligning are performed by the computer system coupled to the imaging subsystem.

20. A computer-implemented method for aligning images of a specimen, comprising:
reducing noise in a test image generated for a specimen by an imaging subsystem thereby generating a denoised test image;
detecting one or more patterned features in the denoised test image extending in at least a horizontal or vertical direction;
designating an area of the denoised test image in which the detected one or more patterned features are located as a region of interest in the denoised test image; and
aligning the denoised test image to a reference image for the specimen using only the region of interest in the denoised test image and a corresponding area in the reference image, wherein said reducing, detecting, designating, and aligning are performed by one or more computer subsystems coupled to the imaging subsystem.

* * * * *